United States Patent
Hickman et al.

(10) Patent No.: US 10,051,837 B2
(45) Date of Patent: Aug. 21, 2018

(54) PET GROOMING ASSEMBLY

(71) Applicants: Jennifer Rebecca Hickman, Leesville, LA (US); Jeffrey Reid Hickman, Leesville, LA (US)

(72) Inventors: Jennifer Rebecca Hickman, Leesville, LA (US); Jeffrey Reid Hickman, Leesville, LA (US)

( * ) Notice: Subject to any disclaimer, the term of this patent is extended or adjusted under 35 U.S.C. 154(b) by 217 days.

(21) Appl. No.: 15/252,855

(22) Filed: Aug. 31, 2016

(65) Prior Publication Data

US 2017/0118954 A1    May 4, 2017

Related U.S. Application Data

(60) Provisional application No. 62/248,273, filed on Oct. 29, 2015.

(51) Int. Cl.
| | |
|---|---|
| *A01K 13/00* | (2006.01) |
| *A61D 11/00* | (2006.01) |
| *A61D 3/00* | (2006.01) |
| *A01K 15/04* | (2006.01) |
| *A01K 1/062* | (2006.01) |

(52) U.S. Cl.
CPC ............ *A01K 13/001* (2013.01); *A01K 1/062* (2013.01); *A01K 15/04* (2013.01)

(58) Field of Classification Search
CPC ......... A01K 13/001; A61D 11/00; A61D 3/00
USPC .................... 5/905, 423, 652.2, 726
See application file for complete search history.

(56) References Cited

U.S. PATENT DOCUMENTS

| | | | | |
|---|---|---|---|---|
| 4,038,974 A * | 8/1977 | Pielkenrood | ......... | A61G 13/108 128/847 |
| 4,559,903 A * | 12/1985 | Bloom | ................ | A01K 13/001 119/416 |
| 4,648,779 A * | 3/1987 | Weitzman | .............. | B65G 51/03 406/88 |
| 4,947,799 A * | 8/1990 | Parker | .................. | A01K 13/001 119/606 |
| 5,435,269 A * | 7/1995 | Chen | .................... | A01K 13/001 119/668 |
| 5,662,069 A | 9/1997 | Smith | | |
| 6,467,112 B1 * | 10/2002 | Cheng | ...................... | A61D 3/00 5/600 |

(Continued)

FOREIGN PATENT DOCUMENTS

FR            2706115 A3 *  12/1994  ............... A61D 3/00

*Primary Examiner* — Monica L Williams
(74) *Attorney, Agent, or Firm* — Global Intellectual Property Agency, LLC; Daniel Boudwin

(57) ABSTRACT

A pet grooming assembly is provided having a table top, a support frame, a blower motor, and a light source. The table top is used to support a pet being groomed thereon, whereby the pet is maintained by a grooming arm and grooming loop extending above the table top. The blower motor is supported under the table top and connects to a conduit and a manifold. The manifold is disposed along the lower surface of the table top and directs air through a plurality of outlets extending through the table top. The outlets direct air upwards and towards the pet standing on the table top for drying purposes. Additionally, the light sources are integrated within the table top and are disposed below a transparent upper surface thereof. In one configuration, strips of LEDs are provided and used to project light upwards from the table top for inspection of the pet.

14 Claims, 4 Drawing Sheets

(56) References Cited

U.S. PATENT DOCUMENTS

Figure 1:
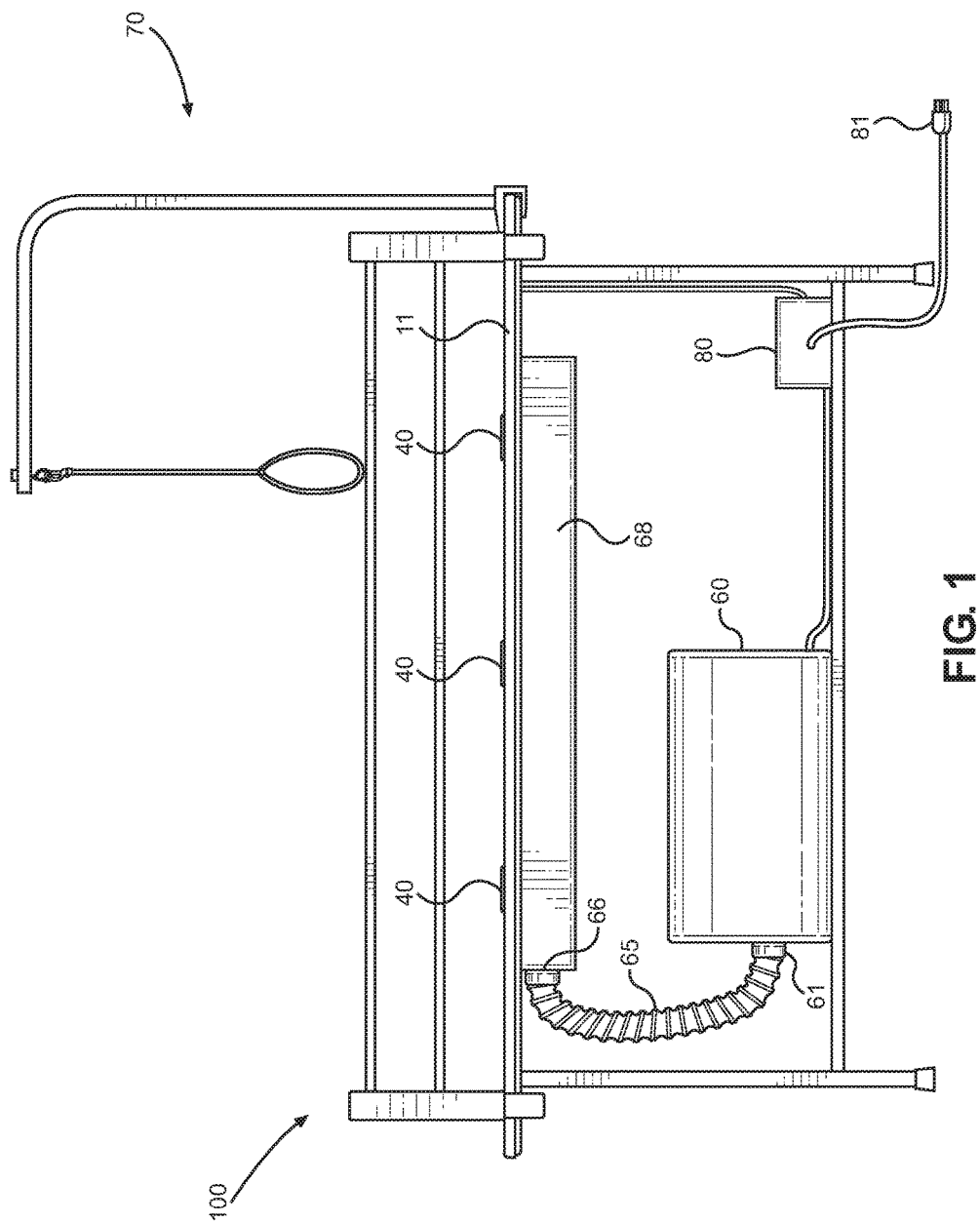

| | | |
|---|---|---|
| 7,503,284 B2 | 3/2009 | Boylan |
| 2007/0195514 A1* | 8/2007 | Katz ....................... G09F 11/29 |
| | | 362/97.1 |
| 2009/0173286 A1* | 7/2009 | Schetlin ............... A01K 13/001 |
| | | 119/606 |
| 2012/0118244 A1 | 5/2012 | Finch |
| 2013/0025545 A1 | 1/2013 | Munoz et al. |
| 2013/0213318 A1 | 8/2013 | Katz |
| 2015/0100037 A1* | 4/2015 | Allsup ................. A01K 13/001 |
| | | 604/503 |
| 2016/0135428 A1* | 5/2016 | Nicholson ............ A01K 13/003 |
| | | 119/604 |

* cited by examiner

PET GROOMING ASSEMBLY

CROSS REFERENCE TO RELATED APPLICATION

This application claims the benefit of U.S. Provisional Application No. 62/248,273 filed on Oct. 29, 2015. The above identified patent application is herein incorporated by reference in its entirety to provide continuity of disclosure.

BACKGROUND OF THE INVENTION

Field of the Invention

The present invention relates to pet grooming stations. More specifically, the present invention relates to a pet grooming station that includes forced air and improved lighting to assist a user grooming a pet on the assembly.

Grooming a pet can be a challenging and even frustrating experience. The groomer must pay careful attention to the pet while on the grooming table to prevent injury to the pet, while at the same time engaging in the grooming tasks. It is undoubtedly difficult to control the pet on the table while engaging in the required washing, clipping, and drying tasks, Further still, in area without adequate light, the groomer may rely on handheld light sources to inspect parts of the pet. This adds an additional item to the list of items being tended to while grooming.

Therefore, to assist users engaged in grooming, the present invention provides a pet grooming table having an integrated lighting system and a forced air system. The lighting system assists in inspecting the pet, while the forced air system dries the pet without handling a hair dryer implement. This allows groomers to use their hands to dry the pet and keep the pet secured to the table.

In particular, the present invention provides a pet grooming table with an integrated light source and a forced air system to improve inspection of the pet and drying thereof. The grooming table comprises a table top surface adapted to support an animal thereon for grooming purposes. Below the table top is a table top frame that supports a blower motor and wiring for the light source. The light source comprises one or more e strips of lights integrated into the table top and projecting upwards therefrom. In addition, the table top includes vents through the table that direct air from the blower motor and toward the underbelly of the animal, allowing for quick cleaning and drying. Together, the dryer system and the lighting system improve a user's ability to efficiently groom a pet.

SUMMARY OF THE INVENTION

The following summary is intended solely for the benefit of the reader and is not intended to be limiting in any way. The present invention provides a new pet grooming assembly that can be utilized for providing convenience for the user when grooming and inspecting a pet on the table top of the assembly.

It is therefore an object of the present invention to provide a new and improved pet grooming assembly that has all of the advantages of the prior art and none of the disadvantages.

It is another object of the present invention to provide a pet grooming assembly comprising a table top, a table top frame thereunder, a grooming arm, and a grooming loop.

Another object of the present invention is to provide a pet grooming assembly wherein the table top has a substantially planar upper surface, a lower surface, sides, and ends.

Yet another object of the present invention is to provide a pet grooming assembly further comprising a blower motor supported by the table top frame under the table top. The blower motor comprises an outlet connected to a conduit, whereby the blower motor is adapted to provide a supply of forced air at a flow rate through the outlet and into the conduit.

Another object of the present invention is to provide a pet grooming assembly wherein the conduit extends from the blower motor and connects to a manifold disposed along the lower surface of the table top. The manifold comprises an inlet and one or more outlets, the outlets of the manifold being disposed along an upper surface thereof. The outlets of the manifold align with apertures through the table top, whereby the forced air received through the inlet of the manifold exits the one or more outlets of the manifold and is forced through the apertures of the table top. The forced air therefrom provides a stream of air to dry a pet standing on the table top.

Another object of the present invention is to provide a pet grooming assembly further comprising a power source adapted to power the blower motor. The power source is preferably an AC cord and transformer, whereby the cord is adapted to connect to an AC outlet.

Another object of the present invention is to provide a pet grooming assembly wherein the table top further comprises a transparent upper surface and a light source disposed along the table top below the transparent upper surface. The light source is adapted to project light upwards from the table top and is additionally powered by the power source.

Another object of the present invention is to provide a pet grooming assembly wherein the light source comprises one or more strips of light emitting diodes.

Another object of the present invention is to provide a pet grooming assembly wherein the blower motor may further comprise a heating element to heat the forced air as it enters the conduit.

Another object of the present invention is to provide a pet grooming assembly wherein the table top further comprises side railings disposed along the sides thereof.

Another object of the present invention is to provide a pet grooming assembly wherein the side railings further comprise horizontal members and vertical posts. The vertical posts may have a cavity therethrough and an open upper such that the vertical posts are adapted to support grooming implements therein.

Another object of the present invention is to provide a pet grooming assembly wherein the table top frame further comprises a plurality of legs and a shelf to support the blower motor thereon. The table top frame legs may additionally be height adjustable to change the height of the table top surface.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner n which it may be made and used may be better understood after a review of the following description, taken in connection with the accompanying drawings wherein like numeral annotations are provided throughout.

FIG. 1 provides a side view of the pet grooming table of the present invention.

Figure 2:
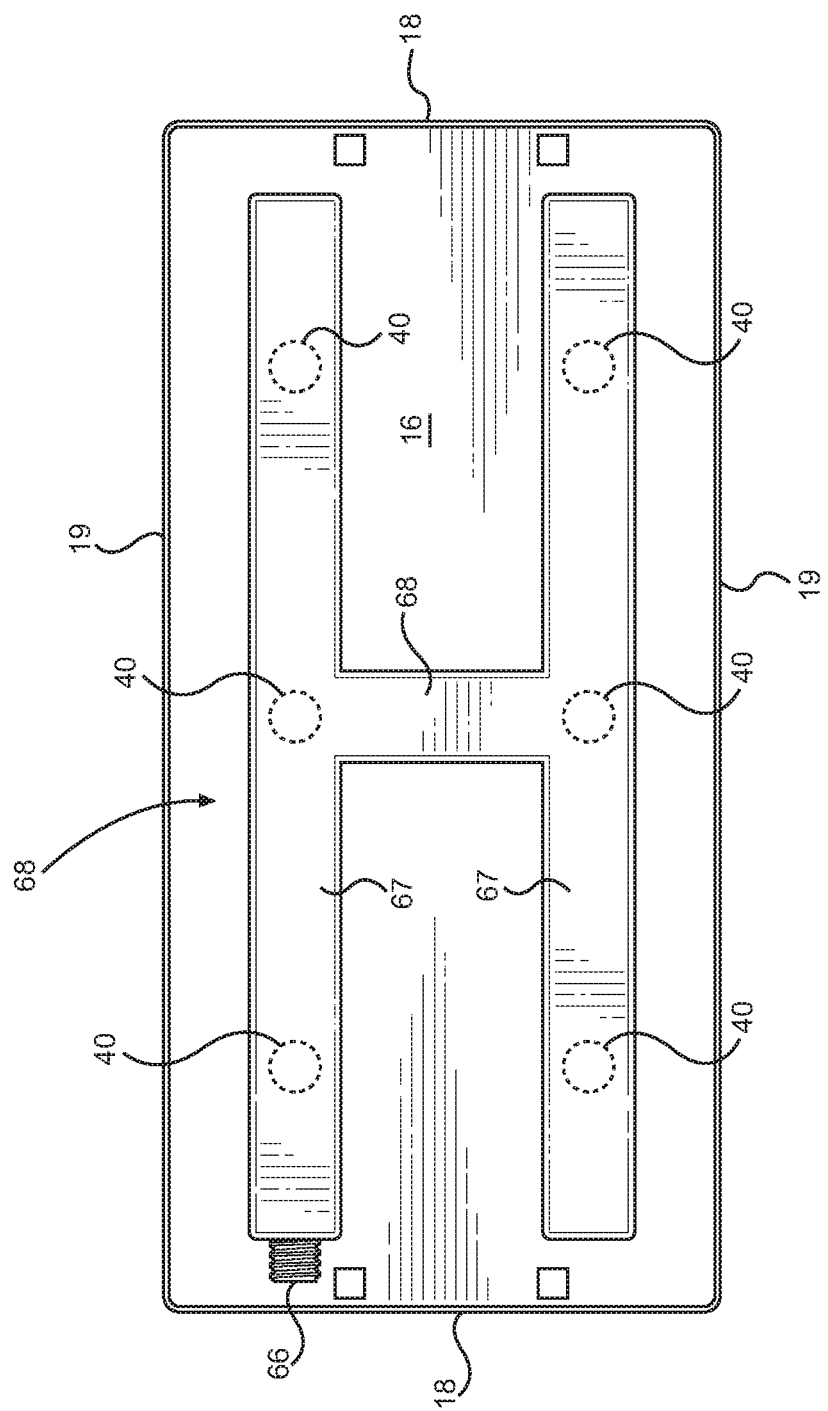

FIG. 2 provides a view of the lower surface of the table top of he present invention, whereby the manifold is shown.

Figure 3:
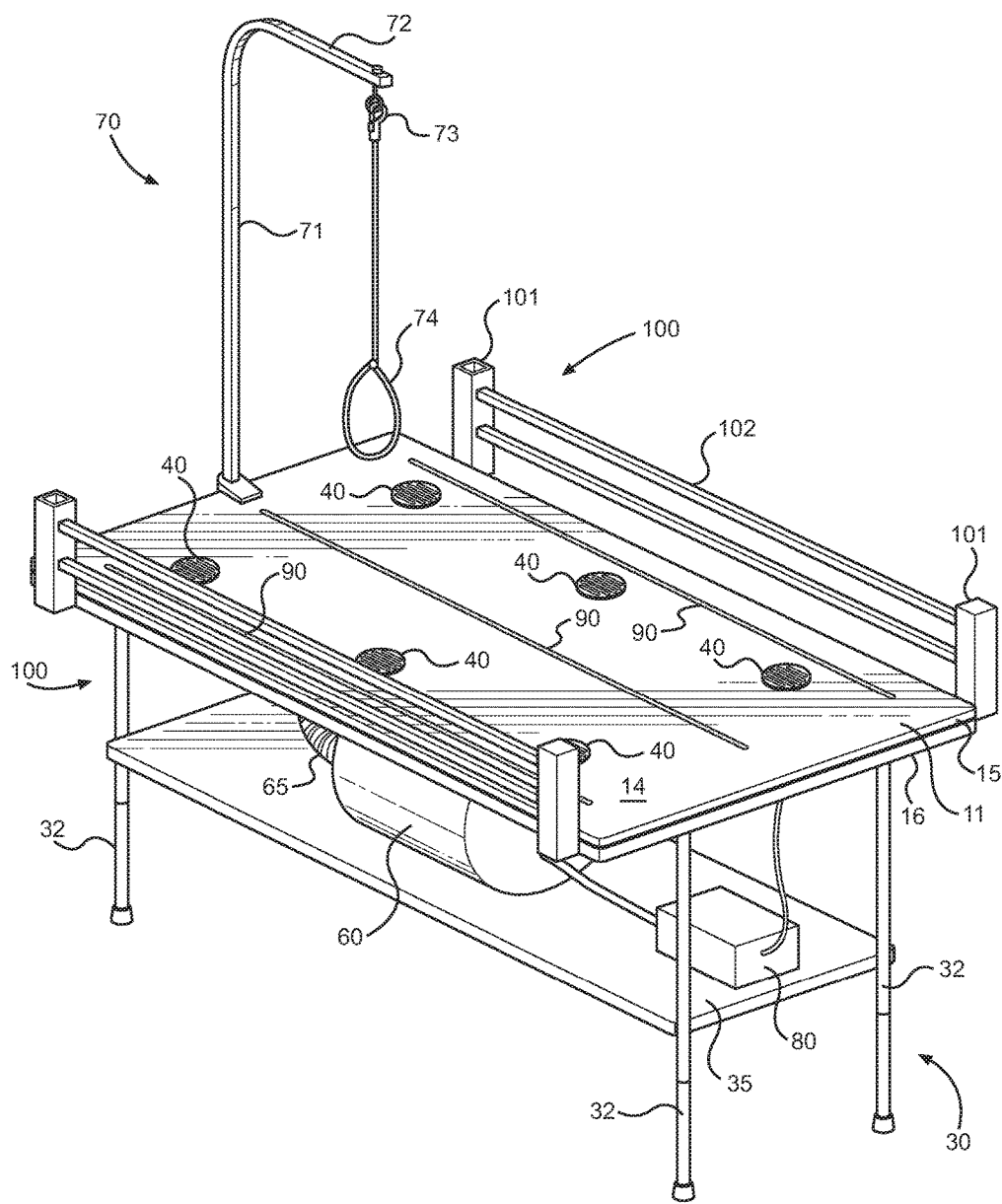

FIG. 3 provides an overhead perspective view of the pet grooming table of the present invention.

Figure 4:
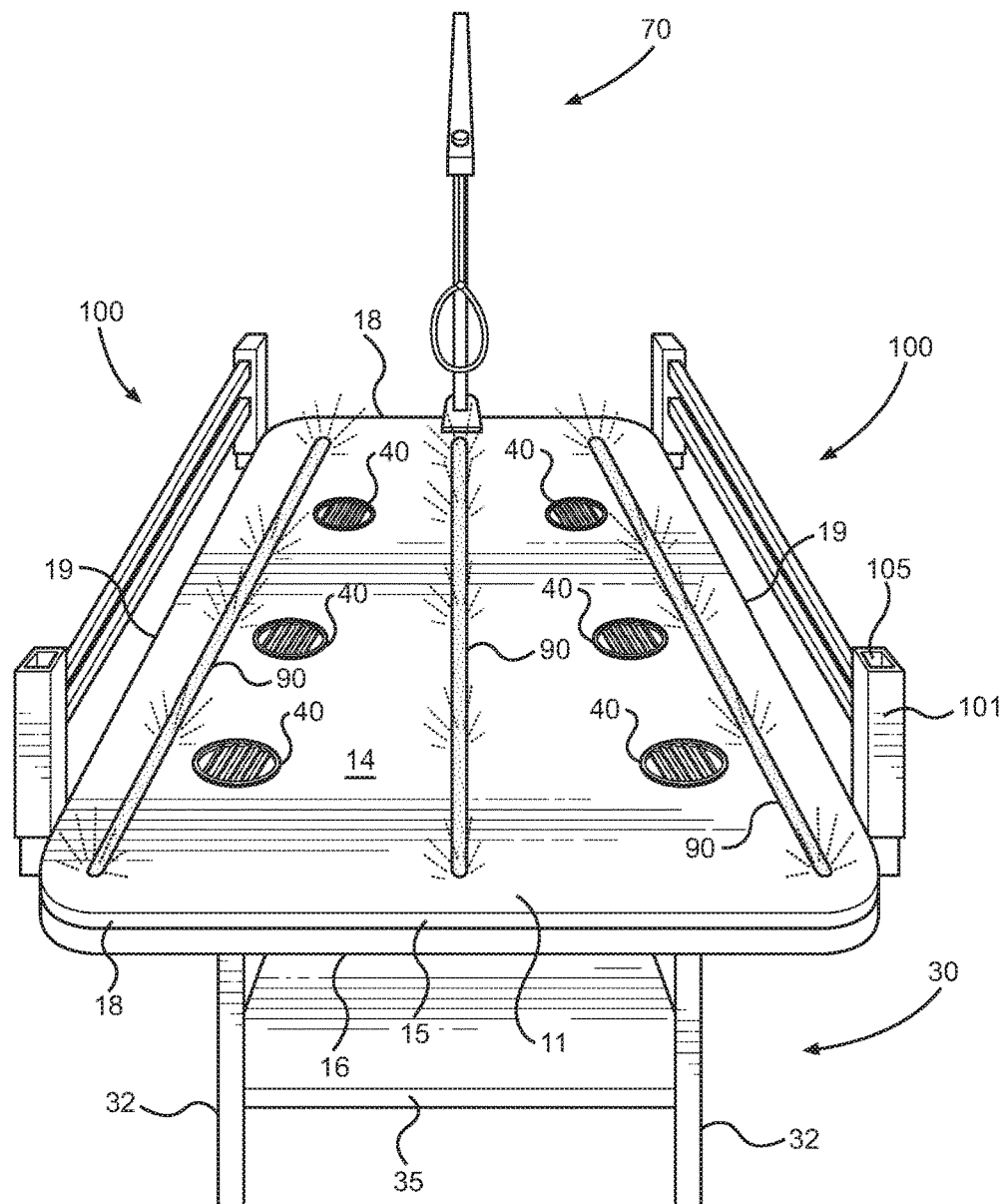

FIG. 4 provides another overhead perspective view of he pet grooming table of the present invention.

DETAILED DESCRIPTION OF THE INVENTION

Reference is made herein to the attached drawings. Like reference numerals are used throughout the drawings to depict like or similar elements of the pet grooming table of the present invention. For the purposes of presenting a brief and clear description of the present invention, the preferred embodiment will be discussed as used for grooming a pet, drying the pet without using an external implement, and for providing increased light during the grooming process. The figures are intended for representative purposes only and should not be considered to be limiting in any respect.

Referring now to FIGS. 1 through 4, there are shown views of the pet grooming assembly of the present invention. The pet grooming assembly is a grooming station having a table top 11, a table top frame 30 supporting the table top 11, and a grooming arm 70 connected to the table top 11 for controlling a pet on the assembly. The table top 11 has a substantially planar upper surface 14, a lower surface 16, sides 19, and ends 18. The table top 11 may be sized to support smaller or larger pets thereon, such as large breed dogs and the like. The pet is positioned on the upper surface 14 of the table top 11 and a grooming loop 74 suspended from the grooming arm 70 is used to control the pet by connecting to the pet's collar or securing around the neck of the pet on the table. To prevent the pet from falling, the sides 19 of the table top 11 may additional comprise upstanding railings 100.

Below the table top 11 is a forced air system that is supported by the table top frame 30 and used to dry the pet standing on the table top 11. The forced air system directs a stream of air, and optionally a heated stream of air, upwards from the table top 11 and directly towards the underbelly of a pet thereon. To accomplish this, the forced air system comprises a blower motor 60 that is preferably electrically-powered. The blower motor 60 includes an induction impeller or similar assembly that draws in ambient air and pressurizes the air before exhausting the air through the blower motor outlet 61. Connecting to the outlet 61 of the blower motor is a conduit 66 that directs air from the blower motor 60 and into a manifold 68 along the lower surface 16 of the table top 11. The manifold 68 is filled with the pressurized air and exits through one of a plurality of outlets 40 disposed along the upper end of the manifold and through the table top 11. The outlets 40 may include vents thereover, whereby the air exits through the vent and is directed upwards toward a pet on the table top 11.

Referring to FIG. 2, an exemplary embodiment of the manifold 68 is shown. The manifold 68 comprises a chamber that includes an air inlet 66 that connects to the conduit of the blower motor. Forced air is received through the inlet 66 and enters the interior chamber of the manifold 68, whereby the air is distributed through the plurality of outlets 40. The outlets 40 of the manifold align with apertures through the table top 11, whereby forced air in the interior of the manifold 68 exits each outlet 40 substantially at the same flow rate and provides multiple air flow vents for a pet standing thereover. In the embodiment presented in FIG. 2, the manifold comprises a rectangular cross section that is enclosed and forms a substantial H-shape with a central lateral portion 68 and two longitudinal sections 67.

Despite the embodiment provided in FIG. 2, the manifold 68 may have an alternative cross section that is not otherwise illustrated. That is, the cross section of the manifold 68 may be rounded or otherwise shaped. Moreover, the overall size and pathways of the manifold may be of alternative designs than presented in FIG. 2, depending on the number of vents/apertures 40 provided through the table top 11 and their positioning therealong. For instance, the manifold may comprise an elongated, linear chamber that provides forced air through several aligned apertures. Alternatively, the manifold 68 may comprise an enlarged, rectangular shape that secures over several apertures using one larger, open chamber. The exact design and configuration may vary, falling within the scope of providing a chamber that accepts and distributes the forced air from the conduit connected to the blower motor.

The blower motor 60 is preferably powered by an AC power source. As shown in FIGS. 1 and 3, the blower motor 60 receives electrical power preferably from an external AC power source, such as a household electrical outlet. An electrical cord and a pronged electrical socket connect 81 is provided. Power is optionally transformed into DC power or otherwise usable power via a transformer and blower motor controller 80. Both the blower motor 60 and controller assembly 80 are preferably supported below the table top 11 and within the structure of the table top support frame 30.

The table top support frame 30 is one that stably supports the table top 11 in a level configuration. The support frame 30 furthermore supports the weight of the blower motor 60, table top 11, and of anticipated pets to be placed on the table top surface 11. In one embodiment, the table top support frame 30 comprises four adjustable-length legs 32 and a lower support shelf under the table top 11. The shelf supports the blower motor 60 and supporting electronics, while the adjustable legs 32 allow the height of the table top 11 to be adjusted upwards or downwards. This is helpful for different groomers of different height and preference.

In addition to a forced air system, the grooming assembly of the present invention additionally provides an integrated light system that directs light upwards from the table top 11 and towards the pet standing thereover. In particular, the table top 11 preferably has a transparent upper surface 15 thereover. One or more light sources 90 are disposed along the table top 11 and below the transparent upper surface 15 thereof and project light when illuminated through the transparent upper surface 15. The light source 90 is adapted to project light upwards from the table top 11 when energized and receiving power from the AC power source. In one configuration, the light sources further comprise one or more strips of light emitting diodes (LEDs) 90 extending longitudinally along the length of the table top 11. A switch is provided along the table top that energizes the LEDs 90 and illuminates the underbelly of the pet on the table top 11. This is helpful for inspecting a pet while on the table.

In yet another embodiment of the present invention, the blower motor 60 of the forced air system may include an integrated heating element therein. The heating element is preferably a resistive heating element energized by the electrical power source and used to heat air exiting the outlet 61 of the blower motor 60. The heated air enters the conduit 65 and enters the inlet 66 of the manifold 68. The heated air is distributed through the interior chamber of the manifold 68 and through the vents 40. The heated air then blows over the pet and assists drying the pet during the grooming process. Operation of the heating element may be an optional mode for the blower motor 60, whereby the blower motor 60 may eject ambient temperature air or heated air on demand.

During the grooming process, the pet must be controlled while positioned on the table top upper surface 14. Disposed along the table top 11 is the grooming arm 70 that comprises an upright portion 71 and a horizontal portion 72. The upright portion 71 extends from one of the sides 18 or ends 16 of the table top 11 and clamps or is fastened thereto. The horizontal portion 72 extends over the upper surface 14 of the table top 11 and supports a suspended grooming loop 74. The grooming loop 74 is a loop that secures around the pet's neck or to the collar of the pet, and furthermore connects at an opposing end 73 to the distal end of the groom arm 70. The connection of the grooming loop 74 to the grooming arm 70 preferably comprises a clasp 73 to allow the loop 74 to be removable from the arm 70 when desired. Additionally, the connection between the grooming arm 70 and the table top 11 must be sufficiently stable and structurally sound to resist the weight of a pet pulling on the grooming loop 74 while attached to the grooming arm 70 during the grooming process.

In addition, the table top 11 preferably has a pair of side railings 100 extending along the sides 18 thereof. The side railings 100 comprise vertical posts 101 and horizontal members 102 therebetween. The railings 100 are upright and prevent the pet from falling off the sides of the table top 11 while being groomed. In addition, the vertical posts 101 may include a cavity therethrough and an open upper 105 such that the vertical posts 101 can be used to support grooming implements therein. These include scissors and other grooming devices. The open interior supports the grooming implements, which are inserted through the open upper 105 thereof.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet grooming assembly, comprising:
a table top having a substantially planar upper surface, a lower surface;
the table top being supported by a table top frame thereunder;
a blower motor supported by the table top frame under the table top;
the blower motor having an outlet connected to a conduit, whereby the blower motor is adapted to provide a supply of forced air at a flow rate through the conduit;
the conduit extending from the blower motor and to a manifold disposed along the lower surface of the table top;
the manifold comprises an inlet and one or more outlets, the outlets of the manifold being disposed along an upper surface thereof;
whereby the outlets of the manifold are aligned with apertures through the table top,
whereby the forced air is received through the inlet of the manifold and exits the one or more outlets of the manifold and through the apertures of the table top;
a grooming arm connected to the table top and extending upwards therefrom;
the grooming arm being adapted to support a grooming loop when securing an animal to the grooming arm while the animal is positioned on the upper surface of the table top;
a power source adapted to power the blower motor; and
a light source disposed along the table top and below the transparent upper surface; the light source being adapted to project light upwards from the table top; the light source being powered by the power source.

2. The pet grooming assembly of claim 1, wherein:
the light source comprises one or more strips of light emitting diodes.

3. The pet grooming assembly of claim 1, wherein:
the blower motor further comprises a heating element to heat the forced air as it enters the conduit.

4. The pet grooming assembly of claim 1, further comprising:
side railings disposed along the sides of the table top.

5. The pet grooming assembly of claim 4, wherein:
the side railings further comprise horizontal members and vertical posts;
the vertical posts having a cavity therethrough and an open upper such that the vertical posts are adapted to support grooming implements therein.

6. The pet grooming assembly of claim 1, wherein:
the table top frame further comprises a plurality of legs and a shelf to support the blower motor thereon;
whereby the legs are height adjustable.

7. The pet grooming assembly of claim 1, wherein:
the power source comprises a transformer and a power cord for receiving AC current from an electrical outlet.

8. A pet grooming assembly, comprising:
a table top having a substantially planar upper surface, a lower surface;
the table top being supported by a table top frame thereunder;
the table top further comprising a transparent upper surface;
a light source disposed along the table top and below the transparent upper surface;
the light source being adapted to project light upwards from the table top;
a grooming arm connected to the table top and extending upwards therefrom;

the grooming arm being adapted to support a grooming loop when securing an animal to the grooming arm while the animal is positioned on the upper surface of the table top;
and
a blower motor supported by the table top frame under the table top:
the blower motor having an outlet connected to a conduit, whereby the blower motor is adapted to provide a supply of forced air at a flow rate through the conduit;
the conduit extending from the blower motor and to a manifold disposed along the lower surface of the table top;
the manifold comprises an inlet and one or more outlets, the outlets of the manifold being disposed along an upper surface thereof;
whereby the outlets of the manifold are aligned with apertures through the table top, whereby the forced air is received through the inlet of the manifold and exits the one or more outlets of the manifold and through the apertures of the table top.

9. The pet grooming assembly of claim 8, wherein:
the light source comprises one or more strips of light emitting diodes.

10. The pet grooming assembly of claim 8, wherein:
the blower motor further comprises a heating element to heat the forced air as it enters the conduit.

11. The pet grooming assembly of claim 8, further comprising: side railings disposed along sides of the table top.

12. The pet grooming assembly of claim 11, wherein:
the side railings further comprise horizontal members and vertical posts;
the vertical posts having a cavity therethrough and an open upper such that the vertical posts are adapted to support grooming implements therein.

13. The pet grooming assembly of claim 8, wherein:
the table top frame further comprises a plurality of legs and a shelf to support the blower motor thereon;
whereby the legs are height adjustable.

14. The pet grooming assembly of claim 8, wherein:
the power source comprises a transformer and a power cord for receiving AC current from an electrical outlet.

\* \* \* \* \*